(12) United States Patent
Oechsle et al.

(10) Patent No.: US 12,018,783 B2
(45) Date of Patent: Jun. 25, 2024

(54) CONNECTOR COUPLING

(71) Applicant: Neoperl GmbH, Müllheim (DE)

(72) Inventors: Daniel Oechsle, Müllheim (DE); Holger Reinhardt, March/Buchheim (DE); Jürgen Höppner, Müllheim (DE); Werner Kury, Müllheim (DE)

(73) Assignee: NEOPERL GMBH, Müllheim (DE)

( * ) Notice: Subject to any disclaimer, the term of this patent is extended or adjusted under 35 U.S.C. 154(b) by 0 days.

(21) Appl. No.: 17/639,959

(22) PCT Filed: Aug. 20, 2020

(86) PCT No.: PCT/EP2020/073434
§ 371 (c)(1),
(2) Date: Mar. 3, 2022

(87) PCT Pub. No.: WO2021/043595
PCT Pub. Date: Mar. 11, 2021

(65) Prior Publication Data
US 2022/0325833 A1     Oct. 13, 2022

(30) Foreign Application Priority Data
Sep. 6, 2019   (DE) .......................... 202019104932.4

(51) Int. Cl.
*F16L 33/30*     (2006.01)
*F16L 33/24*     (2006.01)

(52) U.S. Cl.
CPC ............... *F16L 33/30* (2013.01); *F16L 33/24* (2013.01)

(58) Field of Classification Search
CPC ....... F16L 33/30; F16L 33/24; F16L 33/2078; F16L 33/2073; F16L 33/20; F16L 33/227; F16L 33/2071; F16L 13/143
See application file for complete search history.

(56) References Cited

U.S. PATENT DOCUMENTS

| | | | | |
|---|---|---|---|---|
| 2,139,745 A | * | 12/1938 | Goodall | |
| 2,696,394 A | * | 12/1954 | Kaiser | ...................... F16L 33/24 |
| 3,368,832 A | * | 2/1968 | Rader | ...................... F16L 33/24 |
| 3,408,099 A | * | 10/1968 | Appleton | ................ F16L 33/24 |
| 3,413,020 A | * | 11/1968 | Johns | .................. F16L 33/2073 |
| 4,330,142 A | * | 5/1982 | Paini | |
| 4,603,888 A | * | 8/1986 | Goodall | |

(Continued)

FOREIGN PATENT DOCUMENTS

| | | |
|---|---|---|
| CN | 201715745 U | 1/2011 |
| CN | 206918589 U | 1/2018 |

(Continued)

OTHER PUBLICATIONS

WO-9721053-A1—Machine Tanslation—English (Year: 1997).*

*Primary Examiner* — William S. Choi
(74) *Attorney, Agent, or Firm* — Volpe Koenig (57) ABSTRACT

In the case of a connector coupling, a rib structure (4) is configured on a hose nipple (3), which rib structure (4) has at least one first rib (5), the at least one first rib (5) extending continuously from a rib start (6) as far as a rib end (7) which is spaced apart axially from said rib start (6), and winding around the hose nipple (3) over a circumferential section of more than 180°, preferably more than 270°, particularly preferably over more than 360° or at least once.

19 Claims, 4 Drawing Sheets

(56) References Cited

U.S. PATENT DOCUMENTS

| | | | |
|---|---|---|---|
| 5,382,059 A * | 1/1995 | Wilson | F16L 33/2073 |
| 5,498,043 A * | 3/1996 | Goldenberg | |
| 2002/0167166 A1* | 11/2002 | Klein | F16L 33/30 |
| 2006/0006643 A1 | 1/2006 | Schultz | |
| 2010/0244438 A1 | 9/2010 | Johanson | |
| 2014/0138944 A1 | 5/2014 | Kury | |

FOREIGN PATENT DOCUMENTS

| | | | |
|---|---|---|---|
| CN | 207421600 U | 5/2018 | |
| DE | 3144875 | 9/1982 | |
| DE | 20204631 | 8/2002 | |
| JP | 2012026521 A | 2/2012 | |
| WO | WO-9721053 A1 * | 6/1997 | F16L 33/24 |

\* cited by examiner

CONNECTOR COUPLING

TECHNICAL FIELD

The invention relates to a connector coupling or connector connection for a hose, with a hose nipple, on which a rib structure with at least one first rib is configured.

BACKGROUND

Connector couplings of this type are known and are used, for example, to fasten a hose to a fitting or a further hose. To this end, the hose nipple is plugged into the hose and is pressed or crimped from the outside, in order to make a non-positive or positively locking grip of the hose possible. To this end, a rib structure which increases the positively locking connection can be configured on the hose nipple. It is desirable if the connector coupling is held non-rotatably in the hose, in order that leaks cannot occur during use as a result of slipping of the hose on the hose nipple.

DE 3144875 A1, US 2010 244438 A1, US 2006 006643 A1 and DE 2020 4631 U1 have disclosed hose nipples with customary external single-start screw threads, combined in part with circumferential retaining ribs spaced apart therefrom without a directional change (as in the case of DE 3144875 A1 and DE 2020 4631 U1).

SUMMARY

The invention is based on the object of providing a connector coupling which can be manufactured simply and achieves an improved grip of the hose on the hose nipple with an increased sealing action.

According to the invention, in order to achieve the stated object, one or more of the features disclosed herein are provided. In this way, in particular, it is proposed according to the invention in order to achieve the stated object in the case of a connector coupling of the type described at the outset that the at least one first rib is configured so as to run around over more than 180°, preferably so as to run around over more than 270°, particularly preferably so as to run around over more than 360° or so as to run around at least once on the hose nipple, and that a rib start of the at least one first rib is spaced apart axially from a rib end of the at least one first rib. The invention has recognized that sufficient deviation from the rotational symmetry of the hose nipple can be achieved by way of a configuration of this type of the at least one rib, with the result that an anti-rotation safeguard can be achieved.

It can be provided in the case of one refinement of the invention that the at least one first rib runs at least in sections obliquely with respect to a circumferential direction. In this way, a force component can be developed on the at least one first rib, which force component contributes to an anti-rotation safeguard of the hose or brings about an anti-rotation safeguard of this type.

It can be provided in the case of one refinement of the invention that the at least one first rib runs at least in sections obliquely with respect to an axial direction which runs through the rib. In this way, a force component can be developed on the at least one first rib, which force component contributes to an axial pull-off safeguard of the hose or brings about a pull-off safeguard of this type.

It can be provided in the case of one refinement of the invention that the at least one first rib forms at least one thread turn. It has been shown that this shape is particularly favorable for achieving a satisfactory axial retaining force and a sufficient anti-rotation safeguard.

It can be provided in the case of one refinement of the invention that the rib structure has at least two thread turns, in particular has a multiple-start thread. In this way, steeper thread turns can be realized, as a result of which an anti-rotation safeguard is enhanced.

Flatter thread turns have the advantage that a trickle path which can be configured along the thread turn becomes very long and therefore seals itself.

It can be provided in the case of one refinement of the invention that the rib structure has at least one second rib which crosses the at least one first rib. The second rib can be, for example, a rib which runs obliquely with respect to a circumferential direction of a main body, in particular spirals in the opposite direction, or a rib which runs around along a circumferential line of a main body.

It can be provided in the case of one refinement of the invention that the rib structure has at least one further rib which runs around in the opposite direction with respect to the at least one first rib. In this way, an anti-rotation safeguard in two opposite rotational directions can be provided in a simple way.

As an alternative or in addition, one or more additional features as disclosed herein can be provided to achieve the stated object. Therefore, in particular, it can be provided as an alternative or in addition to achieve the object in the case of a connector coupling of the type described at the outset, the rib structure being configured on a main body, that the main body has a greater outer circumference in a first axial section of the rib structure than in a second axial section of the rib structure. In this way, different axial sections can be defined, in which a plugged-on hose is pressed to a differently pronounced extent. This can be favorable, in order to find a compromise between a high sealing action and a great axial retention force.

It can be provided in the case of one refinement of the invention that the main body has a smaller outer circumference in a third axial section of the rib structure than in the first axial section, the first axial section being arranged between the second axial section and the third axial section. In this way, an axial section with a maximum outer circumference of the main body can be provided. This can facilitate particularly tight sealing of the connection between a hose and the hose nipple.

It can be provided in the case of one refinement of the invention that the main body is of tapering configuration. This can be used, for example, in order to facilitate plugging of the hose nipple into the hose. It can be provided, in particular, that the main body is of conical configuration, in particular widened in a plug-on direction.

It can be provided in the case of one refinement of the invention that the main body is of bulbous configuration. In this way, a circumferential maximum can be configured in the region of the rib structure, in particular spaced apart axially from axial end regions of the rib structure. It can be provided, for example, that the main body is of double cone-shaped configuration in the region of the rib structure.

It can be provided in the case of one refinement of the invention that a rib height is constant along the at least one first rib. It is advantageous here that identical retention forces can be configured in all the rib sections. In particular, it can be provided that the rib height is constant over the entire rib structure. In this way, all the rib sections can be utilized equally for a retention force.

As an alternative or in addition, the features of the third independent claim can be provided to achieve the stated object. In particular, it can therefore be provided as an alternative or in addition to achieve the object in the case of a connector coupling of the type described at the outset, the rib structure being configured on a main body, or in the case of a connector coupling in accordance with one of the preceding refinements, that the rib structure describes an envelope, and that a spacing between the main body and the envelope varies axially. In this way, for example, a crimp sleeve of simple design can be used, in order to achieve a penetration of the rib structure to different depths into a pushed-on hose in different axial sections of a main body of complex design.

It can be provided in the case of one refinement of the invention that the envelope intersects the main body in a further axial section. In this way, axial sections can be provided which are configured so as to be substantially or completely free from ribs.

It can be provided in the case of one refinement of the invention that the envelope is a cylinder. In this way, for example, crimp sleeves can be used which are cylindrical or which differ merely slightly from a cylindrical shape.

It can be provided in the case of one refinement of the invention that the at least one first rib has a profile with an axial deflection in at least one rib section. As a result, an additional anti-rotation safeguard can be brought about.

It can be provided in the case of one refinement of the invention that the at least one first rib assumes a maximum of a rib height in at least one rib section, in particular spaced apart from the rib start and/or from the rib end. In this way, molded projections can be configured on the first rib, which molded projections bring about an additional anti-rotation safeguard. In addition or as an alternative, said molded projections can be configured on the other described ribs. Said molded projections are preferably limited to one circumferential section which is smaller than a quarter or smaller than an eighth of the circumference. In this way, lug-shaped molded projections can be configured. The molded projections can result, for example, in an increase in the rib height by from 20% to 75%.

It can be provided in the case of one refinement of the invention that a preferably conical plugging-on aid is configured at one axial end. It can be provided here, in particular, that the rib structure extends axially into the plugging-on aid, or that the plugging-on aid is of rib-free configuration. In this way, the rib structure can be configured to be as long as possible axially, or plugging on of a hose onto the rib structure can be facilitated.

It can be provided in the case of one refinement of the invention that a plugging-on aid, for example the abovementioned plugging-on aid, has an enlarged outer circumference in comparison with a main body, for example the abovementioned main body, which supports the rib structure. It is advantageous here that the enlarged outer circumference provides an additional axial securing means which, together with the obliquely running rib section, brings about or enhances an anti-rotation safeguard and a securing means against axial tensile forces which are applied to the hose.

Particularly inexpensive production is possible if the hose nipple or the entire connector coupling is produced from a plastic material, in particular using injection molding.

BRIEF DESCRIPTION OF THE DRAWINGS

The invention will now be described in greater detail on the basis of exemplary embodiments, but is not restricted to said exemplary embodiments. Further exemplary embodiments result from combination with the features of individual or several claims among one another and/or with individual or several features therefrom.

In the drawing.

DETAILED DESCRIPTION

Figure 1:
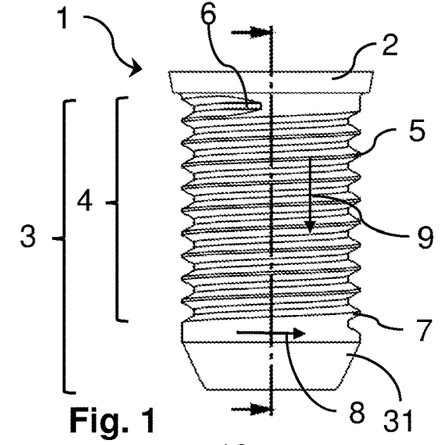
FIG. 1 shows a connector coupling according to the invention with a rib structure in the form of a coarse pitch thread on a cylindrical main body.
Figure 2:
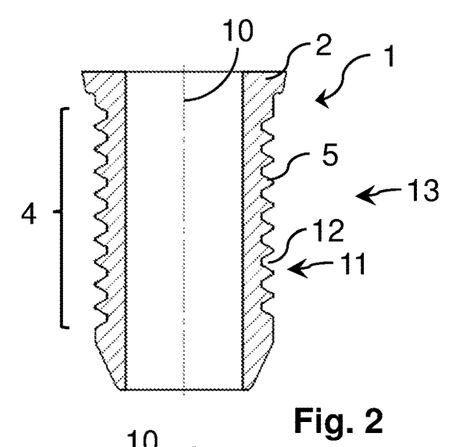
FIG. 2 shows a sectional illustration along the sectional plane from FIG. 1.

FIGS. 1 and 2 show a connector coupling according to the invention, denoted overall by 1, for a hose which is not shown in further detail.

The connector coupling has a connector piece 2, on which a union nut can be arranged in a manner known per se or another functional unit can be arranged, by way of which a hose can be connected to a fitting or to a further hose or to another apparatus for conducting water.

The connector piece 2 is adjoined by a hose nipple 3, onto which the abovementioned hose is plugged in a manner known per se.

A rib structure 4 is configured on the outer side of the hose nipple 3, on which rib structure 4 the plugged-on hose lies.

The rib structure 4 serves to prevent the hose from unintentionally being pulled off from the hose nipple 3. To this end, for example, the rib structure 4 can be pressed into the hose material as a result of an inherent elasticity of the hose material, by way of which the hose lies on the rib structure 4, or by way of additional clips or crimp sleeves which are laid over the plugged-on hose. In this way, radial pressing of the hose material between the clip or crimp sleeve on one side and the hose nipple on the other side can be produced.

The rib structure 4 has at least one first rib 5 which runs from a rib start 6 multiple times around the hose nipple 3 as far as a rib end 7.

Here, the rib start 6 and the rib end 7 are spaced apart axially from one another by the axial extent of the rib structure 4.

This axial spacing and the uniform circulation around the hose nipple 3 result in the first rib 5 running obliquely both with respect to a circumferential direction 8 and with respect to an axial direction 9, that is to say in each case enclosing a non-vanishing angle of less than 90° with the circumferential direction 8 and the axial direction 9. Here, the axial direction 9 results as a parallel line with respect to the longitudinal center axis 10 of the hose nipple 3, which longitudinal center axis 10 runs through the first rib 5 at the respective observed point.

The first rib 5 therefore forms a thread turn 11 with a thread groove 12 which runs next to the first rib 5.

In other words, the thread groove 12 and the first rib 5 form a circumferential thread turn 11 of a thread 13.

Figure 3:
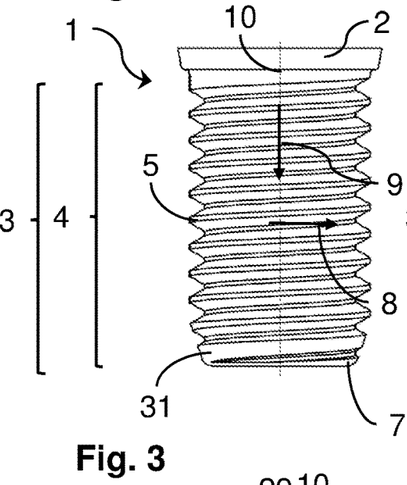
FIG. 3 shows a further connector coupling according to the invention.

FIG. 3 shows a further connector coupling 1 according to the invention. Components and functional units which are similar or identical structurally and/or functionally to the exemplary embodiment according to FIG. 1 and FIG. 2 are denoted by way of the same designations and are not described separately. The comments with respect to FIGS. 1 and 2 therefore apply mutatis mutandis to FIG. 3.

The connector coupling 1 according to FIG. 3 differs from FIGS. 1 and 2 in that the first rib 5 extends over the entire axial length of the hose nipple 3.

In FIG. 3, the rib start 6 is arranged on the rear side of the hose nipple 3 and is therefore not visible.

Figure 4:
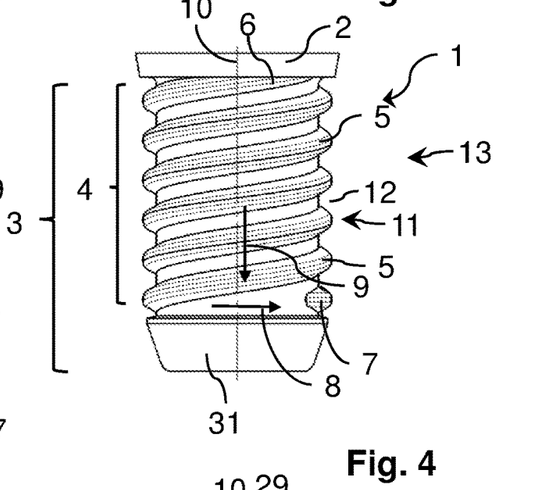
FIG. 4 shows a further connector coupling according to the invention with a rib structure in the form of a dual-start thread.

FIG. 4 shows a further exemplary embodiment according to the invention of a connector coupling 1. Components and functional units which are similar or identical to the exemplary embodiment according to FIGS. 1 to 3 are denoted by way of the same designations and are not described again. The comments with respect to FIGS. 1 to 3 therefore apply mutatis mutandis to FIG. 4.

The exemplary embodiment according to FIG. 4 differs from the preceding exemplary embodiments in that the first rib 5 forms a thread 13 in the form of a coarse thread.

This thread 13 is configured as a dual-start thread, with the result that there are two first ribs 5 in the rib structure 4 which run around the hose nipple 3 at a uniform spacing from one another.

Figure 5:
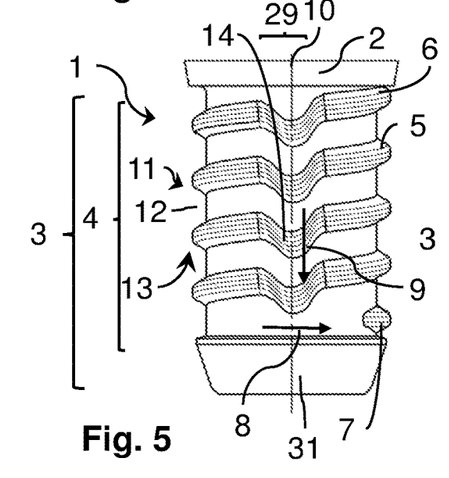
FIG. 5 shows a further connector coupling according to the invention with an axial deflection of the rib.

FIG. 5 shows a further connector coupling according to the invention. Components and functional units which are similar or identical functionally and/or structurally to the preceding exemplary embodiments are denoted by way of the same designations and are not described separately again. The comments with respect to FIGS. 1 to 4 therefore apply mutatis mutandis to FIG. 5.

The thread 13 is configured in FIG. 5 as a single-start coarse thread. As an additional anti-rotation safeguard, the first rib 5 has a plurality of deflections 14 which are oriented in the axial direction 9.

In FIG. 5, by way of example, four deflections 14 are arranged offset axially with respect to one another in the same circumferential section. In the case of further exemplary embodiments, the deflections 14 can also be arranged offset with respect to one another in the circumferential direction.

Figure 6:
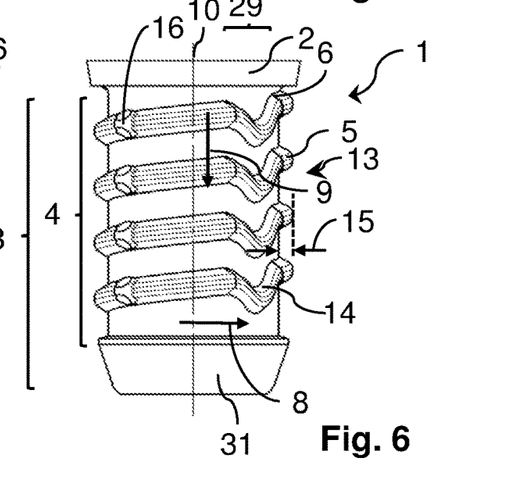
FIG. 6 shows a further connector coupling according to the invention with radially extending molded projections on the rib.

FIG. 6 shows a further connector coupling 1 according to the invention. Components and functional units which are similar or identical functionally and/or structurally to the preceding exemplary embodiments are denoted by way of the same designations and are not described separately again. The comments with respect to FIGS. 1 to 5 therefore apply mutatis mutandis to FIG. 6.

The exemplary embodiment according to FIG. 6 differs from the preceding exemplary embodiments in that the first rib 5 has a varying rib height 15 along its profile. As a result, molded projections 16 are configured, on which the rib material of the first rib 5 protrudes from the hose nipple 3 further than in the vicinity of these molded projections 16. The molded projections 16 are in each case concentrated locally and extend over less than an eighth of the circumference.

This provides an additional anti-rotation safeguard for the hose on the rib structure 4.

Figure 7:
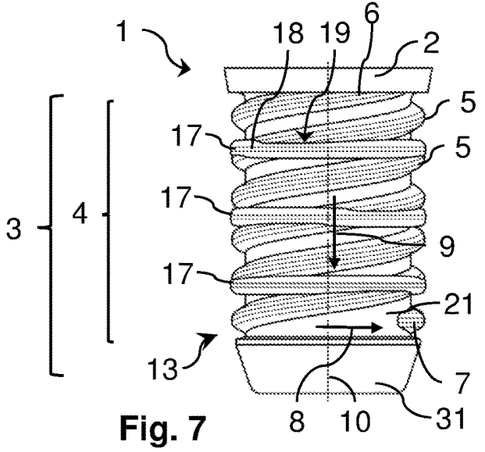
FIG. 7 shows a further connector coupling according to the invention with additional crossing ribs which run around along a circumferential line or in the circumferential direction.

FIG. 7 shows a further connector coupling 1 according to the invention. Components and functional units which are similar or identical functionally and/or structurally to the preceding exemplary embodiments are again denoted by way of the same designations and are not described separately again. The comments with respect to FIGS. 1 to 6 therefore apply mutatis mutandis to FIG. 7.

In an analogous manner with respect to FIG. 4, the exemplary embodiment according to FIG. 7 has two first ribs 5 which run around the hose nipple 3 in the manner of a double helix and form a dual-start thread 13.

In addition, the connector coupling 1 according to FIG. 7 has three second ribs 17 which follow the circumferential direction 8 as closed ribs.

These second ribs 17 therefore cross the first ribs 5 at crossing points 18. In this way, a pocket 19 is formed between the respective first rib 5 and the second rib 17 at these crossing points 18.

In FIG. 7, the rib end 7 is arranged on the rear side of the hose nipple 3 and is therefore not visible.

Figure 8:
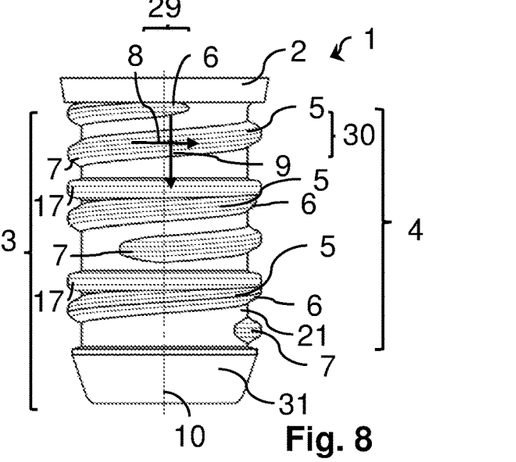
FIG. 8 shows a further connector coupling according to the invention with a rib structure in the form of an interrupted thread turn and additional crossing ribs which run around along a circumferential line.

FIG. 8 shows a further connector coupling 1 according to the invention. Components and functional units which are similar or identical structurally and/or functionally to the preceding exemplary embodiments are again denoted by way of the same designations and are not described separately again. The comments with respect to FIGS. 1 to 7 therefore apply mutatis mutandis to FIG. 8.

The exemplary embodiment according to FIG. 8 differs from the preceding exemplary embodiments in that three first ribs 5 are configured axially next to one another. These first ribs 5 are configured parallel to one another. Respective adjacent first ribs 5 are separated from one another by way of second ribs 17 which are oriented in the circumferential direction.

It can still be seen in FIG. 8 that the first rib 5 runs obliquely with respect to the circumferential direction 8 at least in the rib section 29, and runs obliquely with respect to the axial direction 9 at least in the rib section 30.

Figure 9:
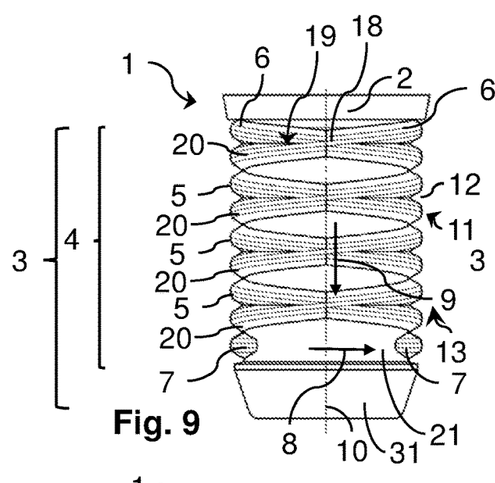
FIG. 9 shows a further connector coupling according to the invention with a rib structure in the form of two crossing thread turns which run around in opposite directions.

FIG. 9 shows a further exemplary embodiment according to the invention. Components and functional units which are similar or identical structurally and/or functionally are again denoted by way of the same designations. The comments with respect to FIGS. 1 to 8 therefore apply mutatis mutandis to FIG. 9.

The exemplary embodiment according to FIG. 9 differs from the preceding exemplary embodiments in that a further rib 20 is configured in addition to the first rib 5. This further rib 20 runs around the hose nipple 3 in the opposite direction to the first rib 5.

This results in a multiplicity of crossing points 18.

Figure 10:
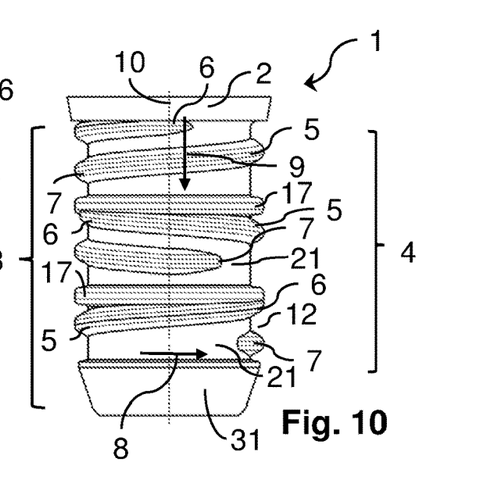
FIG. 10 shows a further connector coupling according to the invention with a rib structure with two thread turns which run around in opposite directions and are spaced apart axially from one another, and additional crossing ribs which run around along a circumferential line.

FIG. 10 shows a further exemplary embodiment according to the invention of a connector coupling 1. Components and functional units which are similar or identical structurally and/or functionally to the preceding exemplary embodiments are again denoted by way of the same designations and are not described separately again. The comments with respect to FIGS. 1 to 9 therefore apply mutatis mutandis to FIG. 10.

The exemplary embodiment according to FIG. 10 has a rib structure 4 which has three first ribs 5 which are arranged axially next to one another. These first ribs 5 are separated from one another in each case by way of second ribs 17 which run in the circumferential direction.

In the case of the exemplary embodiment according to FIG. 10, in contrast to the exemplary embodiment according to FIG. 8, the middle first rib 5 is configured in the opposite direction to the adjacent first ribs 5.

In the case of the exemplary embodiments according to FIGS. 1 to 10, the rib structure 4 is configured in each case on a main body 21 which has the shape of a cylinder.

Figure 11:
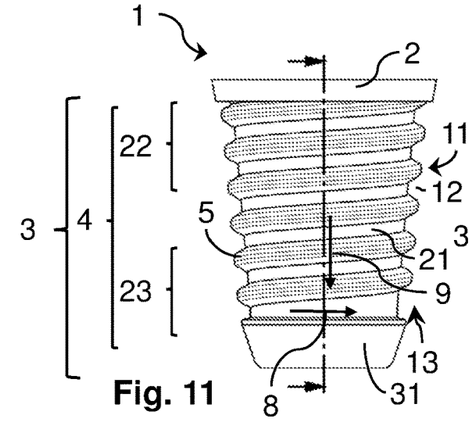
FIG. 11 shows a further connector coupling according to the invention with a conical main body.
Figure 12:
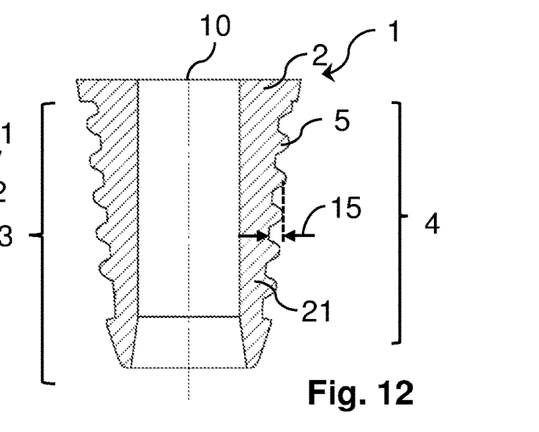
FIG. 12 shows a sectional illustration along the sectional plane from FIG. 11.

FIGS. 11 and 12 show a further connector coupling 1 according to the invention. Components and functional units which are similar or identical structurally and/or functionally to the preceding exemplary embodiments are again denoted by way of the same designations and are not described separately again. The comments with respect to FIGS. 1 to 10 therefore apply mutatis mutandis to FIGS. 11 and 12.

The exemplary embodiment according to FIGS. 11 and 12 differs from the preceding exemplary embodiments in that the main body 21 is not of cylindrical configuration, but rather has a greater outer circumference in a first axial section 22 than in a second axial section 23.

This results in a tapering form of the main body 21 which is oriented counter to the plug-on direction for the hose, with the result that the hose widens when plugged on.

In the case of the exemplary embodiment according to FIGS. 11 and 12, the first rib 5 has a uniform rib height 15.

Figure 13:
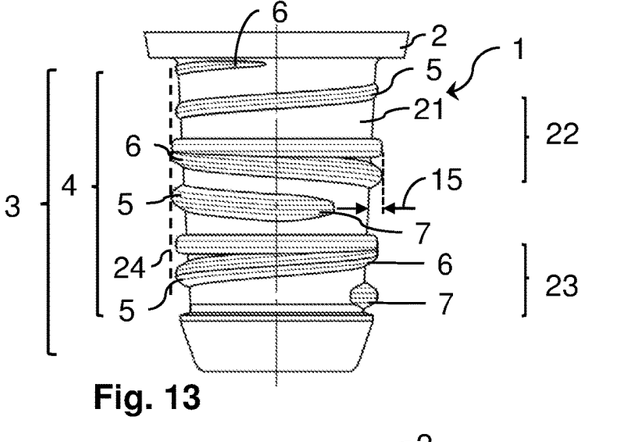
FIG. 13 shows a further connector coupling according to the invention with a conical main body.

FIG. 13 shows a further exemplary embodiment according to the invention of a connector coupling 1. Components and functional units which are similar or identical functionally and/or structurally to the preceding exemplary embodiments are again denoted by way of the same designations and are not described separately. The explanations with respect to FIGS. 1 to 12 therefore apply mutatis mutandis to FIG. 13.

The exemplary embodiment according to FIG. 13 shows by way of example a combination of the rib structure 4 from FIG. 10 with the conical main body 21 from FIG. 11.

Here, the rib height 15 is of smaller configuration in the first axial section 22 than in the second axial section 23. This makes it possible for an envelope 24 of the rib structure 4 to have a cylindrical shape.

Figures 14, 15:
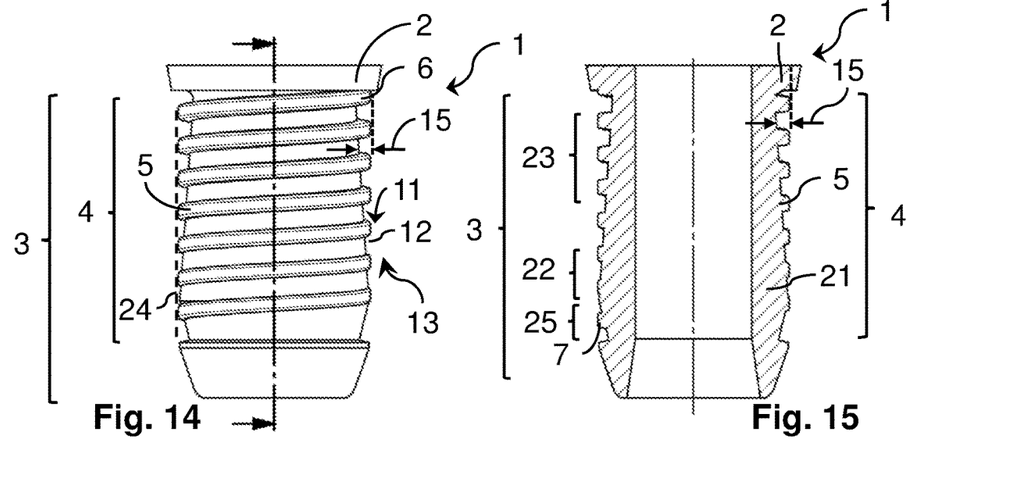
FIG. 14 shows a further connector coupling according to the invention with a bulbous main body.
FIG. 15 shows a sectional illustration along the sectional plane from FIG. 14.

FIGS. 14 and 15 show a further exemplary embodiment according to the invention of a connector coupling 1. Components and functional units which are similar or identical functionally and/or structurally to the preceding exemplary embodiments are denoted by way of the same designations and are not described separately again. The comments with respect to FIGS. 1 to 13 therefore apply mutatis mutandis to FIGS. 14 and 15.

The exemplary embodiment according to FIGS. 14 and 15 differs from the preceding exemplary embodiments in that a third axial section 25 is configured, in which the main body 21 has a smaller outer circumference than in the first axial section 22, the first axial section 22 being arranged between the second axial section 23 and the third axial section 25.

As a result, the main body 21 has a bulbous basic shape which corresponds approximately to a double cone.

In the case of the exemplary embodiment according to FIG. 14, the first rib 5 has a rib height 15 which varies along its profile, with the result that the envelope 24 of the rib structure 4 again has a cylindrical shape.

Figure 16:
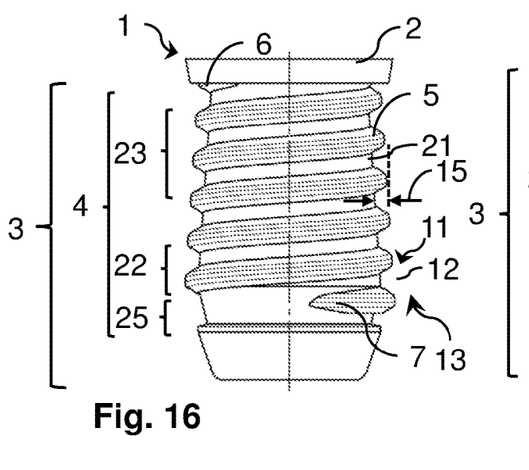
FIG. 16 shows a further connector coupling according to the invention with a bulbous main body and a coarse thread.

FIG. 16 shows a further exemplary embodiment according to the invention. Components and functional units which are similar or identical structurally and/or functionally to the preceding exemplary embodiments are denoted by way of the same designations and are not described separately again. The comments with respect to FIGS. 1 to 15 therefore apply mutatis mutandis to FIG. 16.

The exemplary embodiment according to FIG. 16 differs in that the double cone-shaped main body 21 supports a rib structure 4 which is formed from a first rib 5 with a constant rib height 15.

Figure 17:
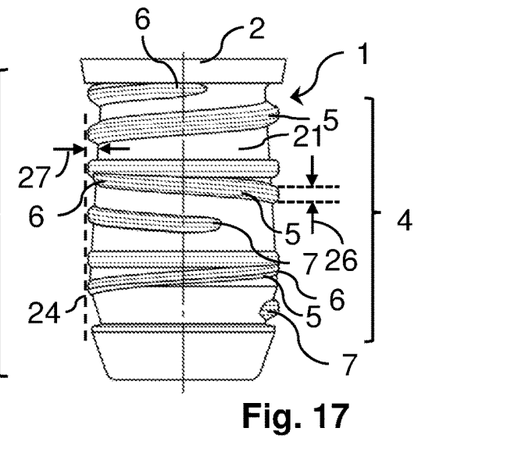
FIG. 17 shows a further connector coupling according to the invention with a bulbous main body, ribs which run in opposite directions, and ribs which run around along a circumferential direction.

FIG. 17 shows a further exemplary embodiment according to the invention, in the case of which components and functional units which are similar or identical structurally and/or functionally to the preceding exemplary embodiments are denoted by way of the same designations and are not described separately again. The comments with respect to FIGS. 1 to 16 therefore apply mutatis mutandis to FIG. 17.

FIG. 17 is a combination of FIGS. 13 and 16, the rib structure 4 being of similar configuration to FIG. 13 and the main body 21 being of similar configuration to FIG. 16.

In the case of the exemplary embodiments according to FIG. 13 and FIG. 17, it is additionally also provided that the rib width 26 of the first ribs 5 is selected to be of different size.

Figure 18:
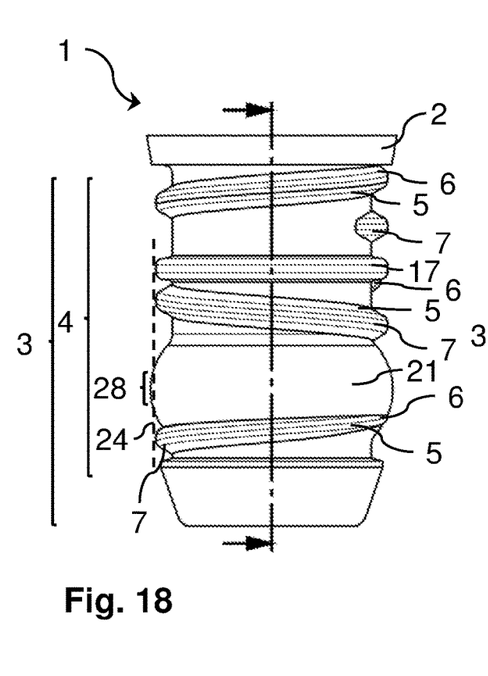
FIG. 18 shows a further connector coupling according to the invention with a bulbous main body.
Figure 19:
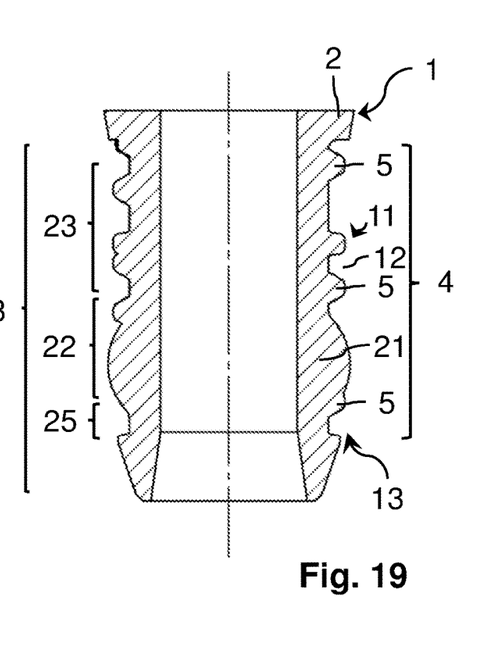
FIG. 19 shows a sectional illustration along the sectional plane from FIG. 18.

FIGS. 18 and 19 show a further exemplary embodiment according to the invention of a connector coupling 1. Components and functional units which are identical or similar functionally and/or structurally to the preceding exemplary embodiments are denoted by way of the same designations and are not described separately again. The comments with respect to FIGS. 1 to 17 therefore apply mutatis mutandis to FIG. 18.

The exemplary embodiment according to FIGS. 18 and 19 has a bulbous main body 21, this bulbous basic shape being composed from a cylinder, which defines the second axial section 23 and the third axial section 25, and a sphere which defines the first axial section 22.

It can also be seen in FIG. 18 that the envelope 24 intersects the main body 21 in a further axial section 28, with the result that the main body 21 projects to the outside beyond the envelope 24 of the rib structure 4 in this further axial section 28. The main body is therefore rib-free in this axial section 28.

A conical plugging-on aid 31 which is known per se is configured at the free end of the hose nipple 3. In the exemplary embodiment according to FIG. 3, the first rib 5 extends into the axial region of the plugging-on aid 31, whereas the plugging-on aid 31 is of rib-free configuration in the remaining exemplary embodiments.

The plugging-on aid 31 has a greater maximum outer circumference than the main body 21, and therefore forms a stop for an axial displacement of the plugged-on hose if the hose nipple 3 tries to be screwed out and/or pulled out of the hose.

In the case of further exemplary embodiments, individual combinations of the features of the preceding exemplary embodiments are combined with one another, for example a rib structure from one exemplary embodiment with a main body from another exemplary embodiment or a part of the rib structure from one exemplary embodiment with the features of one of the claims with another part of a rib structure of a further exemplary embodiment.

In the case of a connector coupling according to the invention, it is therefore proposed for a rib structure 4 to be configured on a hose nipple 3, which rib structure 4 has at least one first rib 5, the at least one first rib 5 extending continuously from a rib start 6 as far as a rib end 7 which is spaced apart axially from this rib start 6, and winding around the hose nipple 3 over a circumferential section of more than 180°, preferably more than 270°, particularly preferably more than 360° or at least once.

LIST OF DESIGNATIONS

1 Connector coupling
2 Connector piece
3 Hose nipple
4 Rib structure
5 (First) rib
6 Rib start
7 Rib end
8 Circumferential direction
9 Axial direction
10 Longitudinal center axis
11 Thread turn
12 Thread groove
13 Thread
14 Deflection
15 Rib height
16 Molded projection
17 (Second) rib
18 Crossing point
19 Pocket
20 (Further) rib
21 Main body
22 (First) axial section
23 (Second) axial section
24 Envelope
25 (Third) axial section
26 Rib width
27 Spacing
28 (Further) axial section
29 Rib section
30 Rib section
31 Plugging-on aid

The invention claimed is:

1. A connector coupling (1) for a hose, the connector coupling comprising:
a hose nipple (3), on which a rib structure (4) with at least one first rib (5) is configured,
the at least one first rib (5) being configured to extend around over more than 180° on the hose nipple (3), and
a rib start (6) of the at least one first rib (5) being spaced apart axially from a rib end (7) of the at least one first rib (5),
wherein
the at least one first rib (5) has a profile with an axial deflection (14) in at least one rib section (29), wherein the first rib (5) forms a thread (13) and the axial deflection (14) deviates from a course of the thread (13) locally in the axial direction, thereby forming an additional anti-rotation safeguard.

2. The connector coupling (1) in accordance with claim 1, wherein
the rib structure (4) has three of the first ribs (5) which are arranged axially next to one another, are configured in parallel with one another, and are separated from one another in each case by second ribs (17) which extend in a circumferential direction (8).

3. The connector coupling (1) as claimed in claim 1, wherein the at least one first rib (5) is configured to extend around over more than 270° or to extend around at least once on the hose nipple (3).

4. The connector coupling (1) as claimed in claim 1, wherein the at least one first rib (5) extends, at least in sections, obliquely with respect to a circumferential direction (8) and/or obliquely with respect to an axial direction (9) which runs through the at least one first rib (5).

5. The connector coupling (1) as claimed in claim 1, wherein the at least one first rib (5) forms at least one thread turn (11).

6. The connector coupling as claimed in claim 1, wherein the rib structure (4) comprises at least two thread turns (11).

7. The connector coupling (1) as claimed in claim 1, wherein the rib structure (4) comprises at least one further rib (20) which extends around in an opposite direction with respect to the at least one first rib (5).

8. A connector coupling (1) for a hose, the connector coupling comprising:
a hose nipple (3), on which a rib structure (4) with at least one first rib (5) is configured,
the at least one first rib (5) being configured to extend around over more than 180° on the hose nipple (3), and
a rib start (6) of the at least one first rib (5) being spaced apart axially from a rib end (7) of the at least one first rib (5),
wherein
the at least one first rib (5) has a profile with an axial deflection (14) in at least one rib section (29) and wherein
the rib structure (4) has at least one second rib (17, 20) which crosses the at least one first rib (5) at a crossing point (18),
the at least one second rib (17) follows a circumferential direction (8) as a closed rib or extends as a further rib (20) around the hose nipple (3) in an opposite direction to the at least one first rib (5).

9. The connector coupling (1) as claimed in claim 2, wherein the at least one second rib (17) extends along a circumferential direction (8) of a main body (21) or obliquely with respect to the circumferential direction (8) of the main body (21).

10. A connector coupling (1) for a hose, the connector coupling comprising:
a hose nipple (3), on which a rib structure (4) with at least one first rib (5) is configured,
the at least one first rib (5) being configured to extend around over more than 180° on the hose nipple (3), and a rib start (6) of the at least one first rib (5) being spaced apart axially from a rib end (7) of the at least one first rib (5), the rib structure (4) being configured on a main body (21), wherein the main body (21) has a greater outer circumference in a first axial section (22) of the rib structure (4) than in a second axial section (23) of the rib structure (4), wherein the first axial section is closer to an insertion end of the hose nipple than the second axial section, and a rib height (15) of the rib structure (4) is of smaller configuration in the first axial section (22) than in the second axial section (23).

11. The connector coupling (1) as claimed in claim 10, wherein the main body (21) has a smaller outer circumference in a third axial section (25) of the rib structure (4) than in the first axial section (23), the first axial section (22) being arranged between the second axial section (23) and the third axial section (25).

12. The connector coupling (1) as claimed in claim 10, wherein the main body (21) is tapered.

13. The connector coupling (1) in accordance with claim 10, wherein the rib structure (4) defines an envelope (24) which has a cylindrical shape, and a radial spacing between the main body (21) and the envelope (24) varies axially such that the rib height (15) of the at least one first rib (5) of the rib structure (4) varies axially.

14. The connector coupling (1) as claimed in claim 13, wherein the hose nipple (3) is comprised of a plastic material.

15. A connector coupling (1) for a hose, the connector coupling comprising:

a hose nipple (3), on which a rib structure (4) with at least one first rib (5) is configured, the at least one first rib (5) being configured to extend around over more than 180° on the hose nipple (3), and a rib start (6) of the at least one first rib (5) being spaced apart axially from a rib end (7) of the at least one first rib (5), wherein the at least one first rib (5) has a profile with an axial deflection (14) in at least one rib section (29), wherein the first rib (5) has a varying rib height (15) along its profile, such that molded projections (16) are configured, on which the rib material of the first rib (5) protrudes from the hose nipple (3) further than in the vicinity of these molded projections (16), thereby forming an additional anti-rotation safeguard.

16. The connector coupling (1) as claimed in claim 15, wherein the at least one first rib (5) is configured to extend around over more than 270° or to extend around at least once on the hose nipple (3).

17. The connector coupling (1) as claimed in claim 15, wherein the at least one first rib (5) extends, at least in sections, obliquely with respect to a circumferential direction (8) and/or obliquely with respect to an axial direction (9) which runs through the at least one first rib (5).

18. The connector coupling (1) as claimed in claim 15, wherein the at least one first rib (5) forms at least one thread turn (11).

19. The connector coupling as claimed in claim 15, wherein the rib structure (4) comprises at least two thread turns (11).

* * * * *

UNITED STATES PATENT AND TRADEMARK OFFICE
CERTIFICATE OF CORRECTION

PATENT NO. : 12,018,783 B2
APPLICATION NO. : 17/639959
DATED : June 25, 2024
INVENTOR(S) : Oechsle et al.

It is certified that error appears in the above-identified patent and that said Letters Patent is hereby corrected as shown below:

On the Title Page

In Item (57), under "Abstract", in Column 2, Lines 1-8, delete: "In the case of a connector coupling, a rib structure (4) is configured on a hose nipple (3), which rib structure (4) has at least one first rib (5), the at least one first rib (5) extending continuously from a rib start (6) as far as a rib end (7) which is spaced apart axially from said rib start (6), and winding around the hose nipple (3) over a circumferential section of more than 180°, preferably more than 270°, particularly preferably over more than 360° or at least once." and insert: -- A connector coupling includes a rib structure configured on a hose nipple, the rib structure has at least one first rib, the at least one first rib extending continuously from a rib start as far as a rib end which is spaced apart axially from the rib start, and winding around the hose nipple over a circumferential section of more than 180°, preferably more than 270°, particularly preferably over more than 360° or at least once. --.

In the Claims

In Claim 9, at Column 2, Line 58, after the word "claim", delete "2" and insert therefor -- 8 --.

Signed and Sealed this
Third Day of December, 2024

Katherine Kelly Vidal
*Director of the United States Patent and Trademark Office*